United States Patent [19]
Zabler

[11] 4,075,551
[45] Feb. 21, 1978

[54] INDUCTIVE DISPLACEMENT SENSOR

[75] Inventor: Erich Zabler, Karlsruhe, Germany

[73] Assignee: Robert Bosch GmbH, Stuttgart, Germany

[21] Appl. No.: 671,984

[22] Filed: Mar. 30, 1976

Related U.S. Application Data

[63] Continuation-in-part of Ser. No. 523,869, Nov. 14, 1974, Pat. No. 3,973,191.

[30] Foreign Application Priority Data

Apr. 8, 1975 Germany ............................ 2515256

[51] Int. Cl.² ...................... G01R 33/02; H01F 21/04
[52] U.S. Cl. ..................................... 324/208; 336/75; 336/79; 324/204; 324/236
[58] Field of Search ............. 324/34 D, 34 PS, 34 R, 324/41; 340/195, 196, 199; 331/65; 336/30, 132, 75, 77, 79; 323/51, 66

[56] References Cited

U.S. PATENT DOCUMENTS

| | | | |
|---|---|---|---|
| 3,479,582 | 11/1969 | Meyer | 324/34 R |
| 4,013,986 | 3/1977 | Weckenmann | 336/75 |

FOREIGN PATENT DOCUMENTS

| | | | |
|---|---|---|---|
| 1,529,112 | 5/1968 | France | 324/34 D |

*Primary Examiner*—Rudolph V. Rolinec
*Assistant Examiner*—Ernest F. Karlsen
*Attorney, Agent, or Firm*—Flynn & Frishauf

[57] ABSTRACT

A variable inductor having a U-shaped magnetic core with a short-circuiting plate providing a short-circuiting ring for both legs of the core movable along the core legs in response to a displacement to be measured is connected in an electronic circuit to generate oscillation of a frequency that is either directly or inversely proportional to the displacement. For the inversely proportional case, the variable inductance component can be combined with an integrator function and connected to an operational amplifier, for generation of the output frequency with a small number of electrical components. The thickness and spacing of the core legs are varied along their length to produce a highly linear inductive transducer characteristic. The core legs are bent in a circle when it is desired to measure an angular displacement.

9 Claims, 11 Drawing Figures

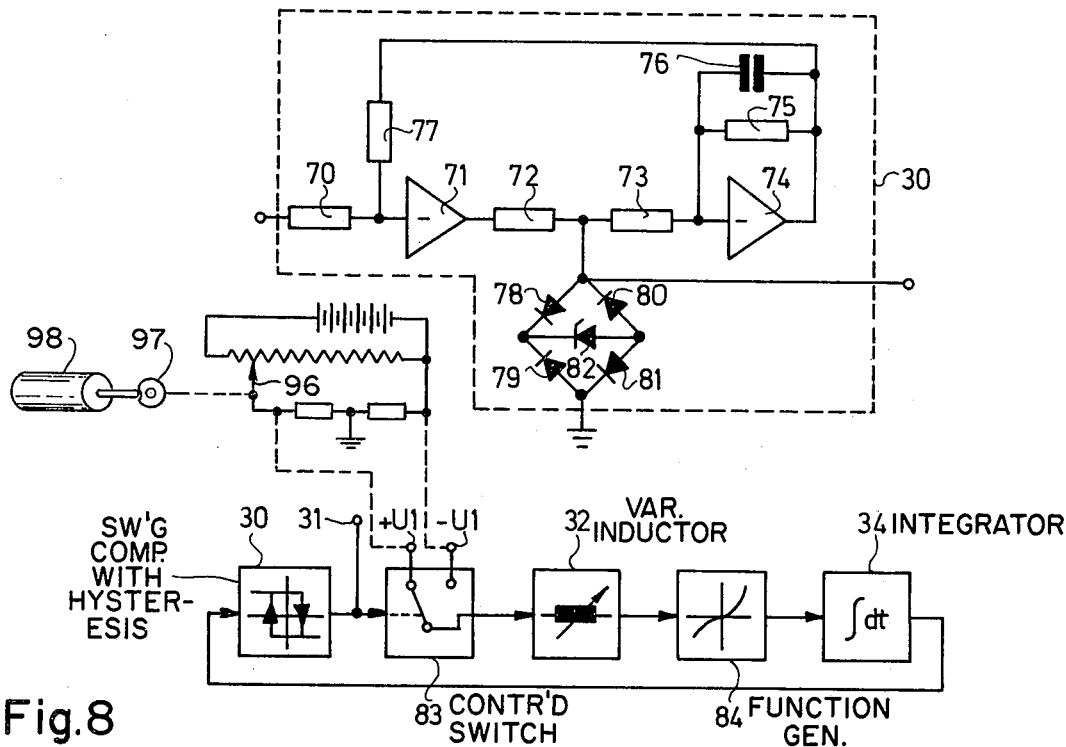
Fig.7
Fig.8
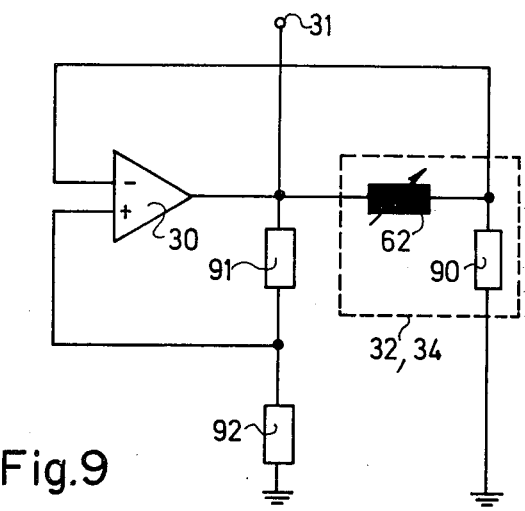
Fig.9

INDUCTIVE DISPLACEMENT SENSOR

This application is a continuation-in-part of my copending application Ser. No. 523,869, filed Nov. 14, 1974, now U.S. Pat. No. 3,973,191.

This invention relates to an inductive displacement sensor or indicator utilizing a variable inductance.

One known inductive displacement sensor is the solenoid type of sensor in which a movable ferromagnetic core is moved in and out of a coil, thereby varying the inductance L of the inductor formed by the coil. Two such solenoid sensors may be coupled in a differential arrangement, so that the inductance of one coil is increased while that of another is reduced. Since the correlation of displacement to inductance is not linear, rather expensive electronic equipment is necessary in this type of apparatus. The sensitivity is low and, moreover, the solenoid type of displacement sensor requires a large mechanical length dimension in relation to the usable linear range of the translation characteristic. A further disadvantage is the relatively large bulk of the ferromagnetic core.

It is an object of the present invention to provide an inductive displacement sensor apparatus with a movable part of the smallest possible bulk and weight, so that it may be useful for both static and dynamic measurements of displacement. It is a further object of the invention to provide an inductive displacement sensor apparatus that is as simple as possible in its mechanical and electronic construction and is economical for manufacture in quantity. It is a particular object of the invention to provide an inductive displacement sensor that is suitable for measuring large displacements as well as small displacements.

SUBJECT MATTER OF THE PRESENT INVENTION

Briefly, a variable inductor is made with a U-shaped core of ferromagnetic material on which an electromagnet coil is provided, preferably at the bend of the U. A member that acts as a short-circuiting ring on each of the legs of the core is provided which is movable along both legs at once, the movement of the short-circuiting ring being made to follow the displacement to be measured. An oscillator circuit is provided for generating a signal dependent upon the inductance of the coil and therefore also upon the magnitude of the displacement.

In a preferred form of the invention for a linear displacement sensing characteristic, the elongated gap between the legs of the core varies in width along its length.

In a particularly advantageous form of this invention the width of the air gap between the legs of the core is constant in both end portions of the gap and between these regions of constant width the gap width changes linearly with respect to the longitudinal dimension from the width the gap has in one end portion to the width it has at the other end portion. This is particularly useful in a sensor having a configuration suitable for sensing angular displacement in which the legs of the core are bent in the shape of circular arcs, so that the short-circuiting apertured plate ("ring") may progress along the core by swinging on an axis passing through and perpendicular to the centers of curvature of the core legs. In such a device, with the variable gap width characteristic just mentioned, an angular displacement transducer can be built having a linear characteristic with a linearity of about ± 0.5% over a working range of angular displacement of as much as 135°. In the use of a comparable device having an air gap of constant width, by contrast, is only an approximation within ± 1.5% over a working angular displacement range of 100° is obtainable.

In another form of the invention the core legs have regions of different thickness. With such a configuration of the core it is possible, for example, to provide a device for measuring the intake air quantity of an internal combustion engine by means of an air measuring device in the intake tube in which a logarithmic characteristic of angle with respect to air flow is provided, the deviations from this desired characteristic being counteracted by variations in core configuration along the length of the core legs (i.e. around the circle over the working angle).

The advantages obtained by the invention include, particularly, the fact that the movable part, the short-circuiting ring, has very small bulk and weight, so that the displacement sensor so provided is well-suited for dynamic measurements as well as for static measurements. In the case of higher frequencies, beginning at about 100 kHz, one or more thin metal foils perforated to pass over the core legs, suffice for the short-circuiting ring. These foils are preferably of copper or silver. Dynamic measurements of displacement made in this fashion are, for example, necessary for measuring the intake air quantity in the intake piping of an internal combustion engine. In that case a diaphragm or a flow-sensing vane can be coupled with the short-circuiting ring, or the short-circuiting ring can itself constitute the diaphragm or vane. The displacement of the diaphragm or vane by the air stream against a restoring force is then a measure for the quantity of air passing through the intake.

A further advantage of the inductive displacement sensor of the present invention is that the output signal can be supplied either as a digital or as an analog signal, as may be desired, to the circuit or device which requires it. A further advantage is to be found in the fact that the legs of the U-shaped cora can be extended enough to enable the measurement of long displacements.

Both the mechanical and the electronic construction of the sensor apparatus of this invention are simple and economical. The U-shaped core can be assembled out of two halves fitted together, so that a coil already completed can be mounted on the core. The air gap at the junction of the two parts can be kept small and is in any event negligible in comparison to the air gap between the two legs of the U-shaped core. The electronic circuit is built up of operational amplifiers, so that the entire circuit can be provided by a single integrated circuit unit. There is still a further advantage resulting from the fact that one form of the invention can provide an output frequency that is directly proportional to the amount of displacement. In a further still simpler form of the invention, an output oscillation having a period proportional to the amount of displacement is produced, which means that a frequency can be obtained from the circuit that is inversely proportional to the displacement. Finally, the circuit can be provided with additional features to establish any desired non-linear displacement-frequency translation characteristic or, on the other hand, to improve the linearity of the translation characteristic.

The invention is further described by way of illustrative examples with reference to the annexed drawings, in which:

FIG. 7 is a diagram of a comparator provided with a linearizing circuit;

FIG. 8 is a block diagram of the electronic portion of another apparatus according to the invention which includes a function generator for providing an arbitrary displacement-frequency translation characteristic;

FIG. 9 is a circuit diagram of a particular simplification of the electronic circuit of FIG. 3;

Figure 1:
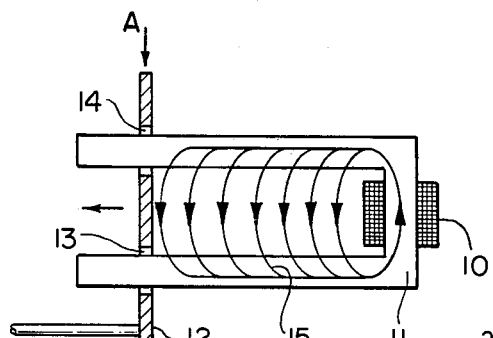
FIG. 1 is a diagrammatic view, partly in section, of a variable inductor provided with a movable short-circuiting ring.
Figure 2:
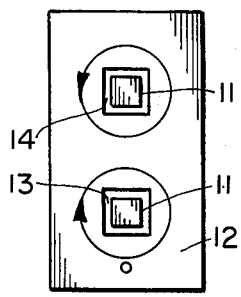
FIG. 2 is an end view of the device of FIG. 1, as seen from the open end of the core, showing the contour of the short-circuiting ring.

In order to obtain variable inductance in the device shown in FIG. 1 and FIG. 2, a magnet coil 10 is fitted to the shape of the cross-section of the core legs. The two legs of the magnet core 11 protrude through the respective openings 13 and 14 in the short-circuiting plate 12. This plate operates as a short-circuiting ring for both legs and is freely movable in a direction parallel to both core legs. Its movements must correspond to the displacement to be measured. For example, a fluid level measuring apparatus may be constituted by using a device of the kind shown in FIGS. 1 and 2, in which case the magnetic core legs would dip vertically into a liquid and the short-circuiting ring 12 would be mounted on a float.

The device shown in FIGS. 1 and 2 operates by the provision by the magnet coil 10 of a homogeneous alternating magnetic field between the two legs of the core 11. The lines of force 15 of the field so produced are shown in FIG. 1. Since the short-circuiting member 12 provides a short-circuited winding for each leg of the core, no alternating magnetic field can proceed beyond the short-circuiting ring in the core legs. To a good approximation, therefore, the total magnetic flux is thus limited to proportionality to the displacement of the short-circuiting ring. In accordance with the induction law, the inductance of the magnet coil 10 is then, likewise, varied in proportion to the displacement. In order to obtain the highest degree of linearity, the spacing between the core legs can be varied as a function of displacement. For angular measurements an analogous device can be provided in which the legs of the core, instead of being straight and parallel, are bent into arcs of circles.

In order to reduce to the lowest possible value the temperature dependence of the device that results from the temperature dependence of the conductivity of the short-circuiting ring 12, the operating frequency of the alternating field can be made high (for example 100kHz), in which case the increase of the ohmic resistance of the short-circuiting ring as the result of skin effect can be mitigated in the following manner: manufacture of the short-circuiting ring from a stack of thin metal sheets or foils laminated together, or manufacture of the short-circuiting ring out of a number of turns of thin wire.

Figure 3:
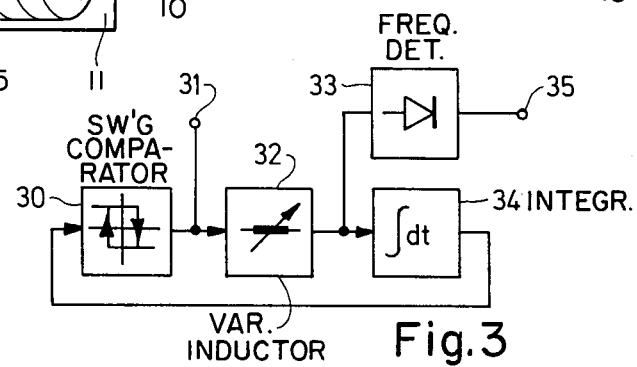
FIG. 3 is a block diagram of the electric portion of the inductive sensor apparatus, utilizing the device of FIGS. 1 and 2.

In the block diagram of a circuit shown in FIG. 3, there is shown an oscillator in which the frequency depends upon the momentary magnitude of the inductance of the variable inductor. It includes a switching comparator 30 that has a hysteresis characteristic. The comparator has an upper switching threshold $+U_0$ and a lower switching threshold $-U_0$. Its output is connectd both to the output terminal 31 of the oscillator and to the input of a controllable inductive device 32. This inductive device 32 contains a variable inductor of the form shown in FIGS. 1 and 2 to provide a variable inductance. It is, of course, possible to utilize a different kind of variable inductance in this kind of circuit. The output of the variable inductance unit 32 is connected both with the input of a rectifier stage 33 and with the input of an integrator stage 34. The output of the integrator stage 34 is connected to the input of the comparator 30. The output of the rectifier stage 33 is connected to an output terminal 35 which constitutes an analog output of the oscillator.

Figure 4:
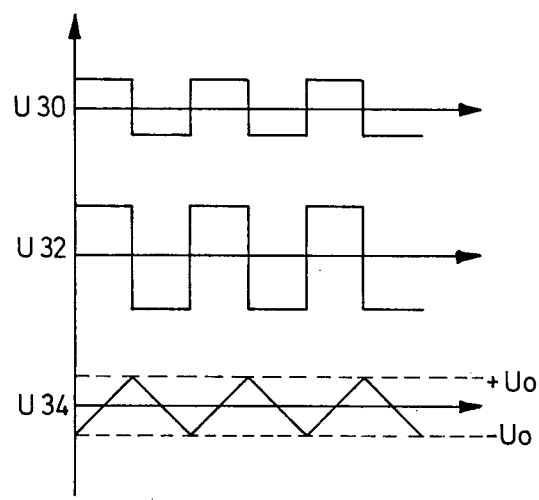
FIG. 4 is a timing diagram for explaining the operation of the circuit of FIG. 3.

The operation of the circuit of FIG. 3 is best understood with reference to the timing diagram given in FIG. 4. It should first be assumed that a positive voltage is present at the output of the comparator 30. This voltage is raised or lowered by the inductive unit 32 in accordance with the position of the control of the variable inductance. This raising or lowering results from operation of the variable inductor in dependence on the displacement to be measured, i.e. in accordance with the position of the short-circuiting ring 12. The positive voltage at the output of the inductive unit 32 is integrated by the integrator 34. The higher the voltage at the output of the inductive unit 32, the faster the integration proceeds, i.e. the faster is the voltage rise of the output of the integrator 34. As soon as the upper switching threshold $U_0$ of the comparator 30 is reached, the voltage at the output of the comparator 30 jumps back to a negative value. The voltage at the output of the inductive unit 32 then changes correspondingly. At the output of the integrator 34, a decreasing voltage is produced that continues to decrease until a lower threshold value $-U_0$ of the comparator is reached. The output of the comparator 30 then jumps back to a positive voltage value. The magnitude of the voltage at the output of the inductive unit 32 is, accordingly, a measure for the rise time or fall time of the integrator voltage and, therefore, a measure for the frequency of the oscillator.

The rectifying stage 33 rectifies the voltage at the output of the inductive unit 32, so that a d.c. voltage signal is provided at the analog output 35 which is proportional to the variable inductance and, accordingly, proportional to the displacement to be measured. The displacement to be measured can thus be indicated at both digital and analog output signals.

Figure 5:
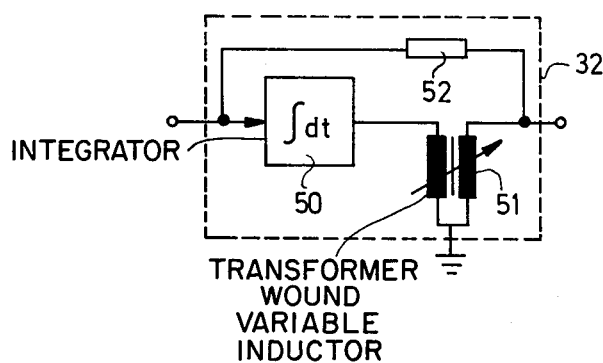
FIG. 5 is a diagram of a controllable inductive device suitable for the circuit of FIG. 3.

The circuit shown in FIG. 5 shows another form of inductive variable component 32 containing some other elements in addition to a variable inductor. The rectangular voltage wave coming from the comparator 30 is integrated in the integrator 50, so that a triangular current wave appears at the output of the integrator 50. This triangular wave is differentiated by the transformer 51, so that at the output of the variable inductive component 32 there is again produced a rectangular voltage wave. This occurs because the triangular current wave at the output of the integrator 50, in accordance with the induction law, produces a rectangular induced voltage across a primary winding which can be taken off from the unloaded secondary winding that is subject to the same encircling magnetic flux. This secondary winding can actually be provided on top of the magnet winding 10 on the U-shaped magnetic core 11. By thus providing the induced voltage as an output by transformer action from the variable inductor, a galvanic separation is obtained. The direct current stability of the oscillator lost by this arrangement can be restored by provision of a very lightly loaded direct current parallel branch circuit. This parallel branch circuit is provided by the resistor 52 bridging the entire circuit unit 32. Without the provision of the resistor 52, there would not be sufficient stability of the oscillator because of the integration drift of the following integrator 34. The advantages of using the variable inductive component 32 in the oscillator circuit are to be found particularly in the fact that the output frequency is directly proportional to the displacement to be measured.

Figure 6:
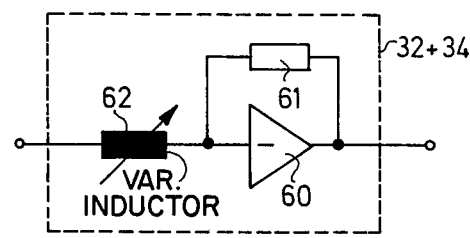
FIG. 6 is a diagram of a combination of a controllable inductive device with an integrator.

FIG. 6 shows a circuit for a combination of the variable inductive component 32 with the integrator 34. This circuit of an inductive integrator consists of an operational amplifier 60 provided with a feedback resistor 61. A variable inductor 62 is connected in series with the inverting input of the operational amplifier 60 and can preferably be a variable inductor of the type shown in FIGS. 1 and 2. This circuit practically represents a reversal of the usual differentiator, in which a capacitor is provided in series with the inverting input of the operational amplifier. When the arrangement shown in FIG. 6 is used in a circuit of the type of FIG. 3, there results considerable simplification of the arrangement of FIG. 3, particularly the type of arrangement according to FIG. 3 in which instead of the variable inductive component 32 of FIG. 3, a circuit like that of FIG. 5 is used. Nevertheless, when the circuit of FIG. 6 is used, the output frequency is then inversely proportional to the displacement to be measured, hence proportional to the period of one cycle of the output frequency. Furthermore, in order to obtain an analog output signal, the arrangement of the rectifying stage 33 shown in FIG. 3 can no longer be used. The frequency of the triangular output voltage wave of the integrator 34 must now be differentiated by a differentiator, not shown in the drawing, in order to again obtain a rectangular signal wave. This rectangular signal is then rectified by a rectifier stage (not shown) at the output of which the desired analog output signal appears.

The circuit shown in FIG. 7 represents a comparator having a hysteresis characteristic by means of which the linearity of the inductive displacement sensor can be improved by variation of the threshold voltages $+U_0$ and $-U_0$ respectively. Experiments have shown that when a U-shaped core is used that has a constant and not too small spacing between the legs, deviations from linearity appear at higher frequencies. As the displacement to be measured increases, the frequency increases at a rate less than that proportional to the displacement. A compensation for this effect can be provided by making one or both of the threshold voltages $U_0$ and $-U_0$ dependent on frequency, i.e. reducing their absolute value for higher frequencies. The input of the comparator in FIG. 7 is, accordingly, connected over a resistor 70 with the inverting input of an operational amplifier 71, the output of which is connected over two resistors 72 and 73 with the inverting input of a second operational amplifier 74. This second operational amplifier 74 is bridged from output to input by a feedback path formed by the parallel combination of the resistor 75 and the capacitor 76 and its output is connected back, through a resistor 77, to the inverting input of the first operational amplifier 71. The connection point of the two resistors 72 and 73 is connected on one hand with the output of the comparator 30 and, on the other hand, over a bridge circuit composed of four diodes 78,79,80 and 81, to ground. The oppositely poled diodes 78 and 79 form one adjacent pair of bridge arms between the comparator and ground and the oppositely poled diodes 80 and 81 form the other pair of bridge arms. A Zener diode 82 is connected across the transverse diagonal bridge of this bridge (a diagonal which is conjugate to the comparator-ground diagonal).

Without the components indicated by the reference numerals 73 to 76, the circuit would be an ordinary known form of comparator. The two levels of the rectangular output voltage wave are stabilized by the diode network 78-82. The voltage appearing at the output is fed back over the resistor 77 to the input and stabilizes the new condition. This feedback is delayed by the components 73 to 76, which constitute a delay stage. Accordingly, when the input voltage reaches the value $U_0$, or $-U_0$, as the case may be, the output voltage then jumps exactly to its opposite value. At higher frequency, as the result of the time delay produced particularly by the capacitor 76, the voltage at the output of the second operational amplifier 74 can no longer reach its final value. The switching operation therefore already takes place at input voltages that are smaller than $U_0$. The two thresholds thus gradually approach each other. By suitable dimensioning of the components 73 to 76, compensation can be provided for the deviation from linearity of the displacement translation characteristic of the variable inductor.

FIG. 8 shows a generalized circuit, in block form, for obtaining any arbitrarily chosen non-linear displacement-frequency translation characteristic. The general constitution of the circuit of FIG. 8 and its manner of operation correspond basically to the circuit of FIG. 3. Between the variable inductor 32 and the integrator 34, a function generator 84 is interposed. The threshold voltages $U_0$ and $-U_0$ are shiftable to any values in a reasonable range by the function generator 84, so that any arbitrarily chosen non-linear displacement-frequency translation characteristic can be obtained. The output signal of the inductive displacement sensor apparatus as a whole can thus represent any arbitrarily chosen function of the displacement. It is even possible to provide to the function generator through the variable inductive component 32 voltages $+U_1$ and $-U_1$ corresponding to arbitrary parameters, so that the output voltage of the inductive component will be proportional not only to the displacement but also to these parameters. A signal generator 95 is shown in FIG. 8 connected by dashed lines to the inputs of the control switch 83 to signify modifying the output of the displacement sensor by arbitrary parameters in this fashion. In this case, a voltage balanced to ground is varied by a potentiometer 96 moved by a cam 97 driven by a motor 98.

A feature of the comparator is the possibility of selecting threshold and output voltages for the comparator that are proportional to each other or identical. Since the output frequency and, consequently, the cycle period for this frequency are proportional to the comparator output voltage and inversely proportional to the comparator threshold voltage, the output frequency is not subject to influence from variations of these voltages. Unregulated voltages can then be used for this circuit.

FIG. 9 shows a very simple form of circuit for a combination of the variable inductive component 32 with the integrator 34, in which the variable inductor 62 has one terminal of its winding connected both to ground over a resistor 90 and also to the inverting input of an operational amplifier serving as the comparator 30. The noninverting input of the operational amplifier 30 is connected to the tap of a voltage divider composed of two resistors 91 and 92, the resistor 92 being connected between the tap and ground and the resistor 91 between the tap connection and the output terminal 31. The output of the operational amplifier 30 and the other terminal of the variable inductor 62 are connected to the output terminal 31. The voltage supply connection for the operational amplifier 30 is not shown in the diagram, as these are well known for operational amplifiers and would merely complicate the diagram.

The operation of the circuit shown in FIG. 9 corresponds essentially to the mode of operation previously described. If a certain voltage is present at the output of the operational amplifier 30, the current in the inductor increases and with it the voltage across the resistor 90 increases in very nearly linear fashion. This voltage is supplied to the inverting input of the operational amplifier 30 where it continues to rise until it reaches the voltage that is present at the tap of the voltage divider 91,92. At that moment, the voltage at the output of the operational amplifier suddenly changes from a positive to a negative voltage. In consequence, a negative voltage then appears at the tap of the voltage divider 91,92. The voltage across the resistor 90 and, hence also at the inverting input of the operational amplifier, now falls at a very nearly constant rate, until it reaches the voltage now present at the tap of the voltage divider 91,92. At that moment, a positive voltage again appears at the output of the operational amplifier and the entire cycle is repeated anew.

A triangular voltage wave accordingly is produced at the inverting input of the operational amplifier 30, while at the output of the operational amplifier 30 and, therefore, at the output terminal 31, a rectangular voltage wave appears. The output frequency thus produced is inversely proportional to the displacement to be measured, which is to say that the repetition period of the wave is proportional to the displacement to be measured.

This very simple circuit that requires, in addition to the variable inductor, merely a single operational amplifier and a single resistor, has a high linearity, a very small dependence upon the supply voltage and an adequately small dependence upon temperature. Since this combination has only very small space requirements, the circuit is preferably incorporated in the structure or mounting of the variable inductor, so that the output frequency can be generated directly at the place of measurement and then supplied to an indicator or to a work circuit at another location over electrical connections.

Figure 10:
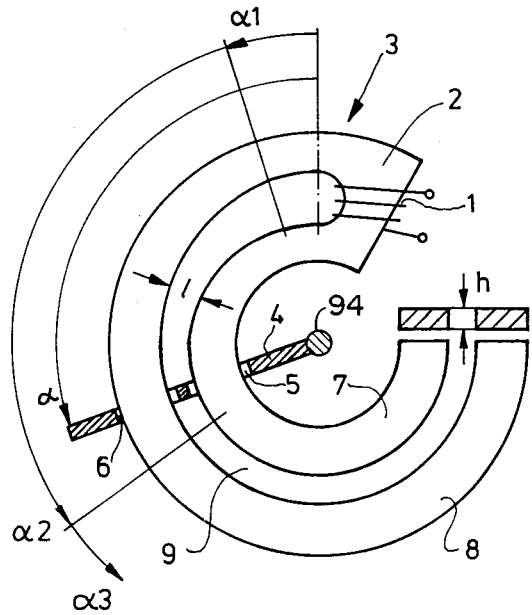
FIG. 10 is a diagrammatic plan view of an angular displacement inductive sensor according to the invention in which the air gap and the core leg thickness varies with angle with respect to a central axis about which the core legs are bent.

In the embodiment shown in FIG. 10, a magnet coil 1 is wound on the yoke 2 of a core 3 of ferromagnetic material that has two elongated legs 7 and 8 that are of a bent shape, conforming to arcs of a circle. In FIG. 10 the legs are radially spaced and are shaped concentrically, but of course it will be understood that the core legs could to a similar effect be constituted with axial spacing, in which the yoke 2 instead of being disposed radially would be disposed in a direction parallel to the axis of the device.

A short-circuiting ring member 4 is in the form of a conducting plate having two openings 5 and 6 shaped to clear the cross section of the core legs that pass through these openings. The short-circuiting ring member 4 is freely movable along the length of the core, which is to say that it is mounted so as to swing about the axis of the shaft 94, on which it is mounted. The shaft 94 is connected to a body (not shown) of which it is desired to measure the angular position, as in the case of a sensing flap or vane in the air intake of an engine.

Particularly for use in the measurement of air flow in an engine intake, it is important to provide a high degree of accuracy in the desired relation between the movement of the vane or other object the angular displacement of which is to be measured and the inductance of the coil 1. In accordance with the invention, this is provided by having the width of the gap between the legs 7 and 8, designated W in FIG. 2, be constant over an angular measurement region $\alpha_1$, and then taper linearly over a measurement region $\alpha_2$ down to a smaller value which then remains constant over a measurement region $\alpha_3$. The variation of the gap width is shown in a graphical plot in FIG. 2, where the width W is plotted against the angle $\alpha$. The lower part of FIG. 2 shows also the variation of the thickness $h$ of the core 3 in the axial direction over the working region of angular measurement. The variation of $h$ in this case is stepwise in the middle of the range, but other variations may be useful in other applications.

Figure 11:
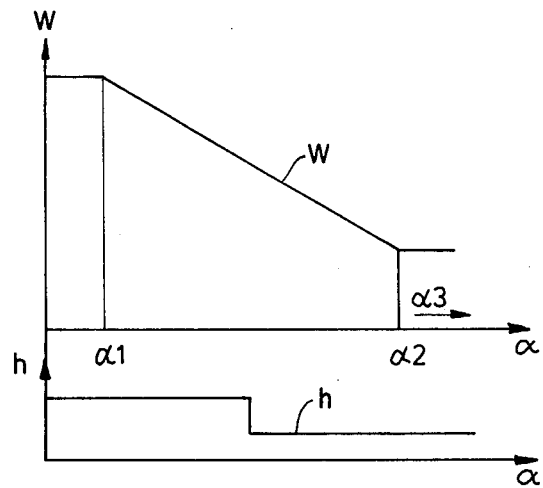
FIG. 11 is a graph showing the variation of air gap and core leg thickness with angle in the device of FIG. 10.

The manner of operation of the inductive angular displacement transducer of FIGS. 10 and 11 is based on the production by means of the magnet winding 1 of a homogeneous alternating magnetic field between the legs 7 and 8 of the core 3. The short-circuiting ring member 4 provides a short-circuiting turn for each of the legs 7 and 8, so that no alternating magnetic field can penetrate through or beyond the short-circuiting ring 4. The total magnetic flux produced by the coil is consequently caused to vary proportionally to angular displacement of the short-circuiting ring member 4, to a good approximation. In accordance with the inductance law the inductance of the magnet coil 1 will then likewise be changed in proportion to angular displacement.

In order to obtain maximum linearity, the width W of the air gap 9 between the legs 7 and 8 is varied as a function of the angle $\alpha$. The width W is preferably, as shown in FIG. 10 and 11, constant over a region $\alpha_1$, linearly decreasing over a second region $\alpha_2$ and then constant again at a smaller value over a third region $\alpha_3$. In order to straighten out the overall transducer characteristic in terms of the quantities to be related, the axial thickness $h$ of the core 3 can likewise be varied over the working region of angular measurement, either stepwise, as illustrated in FIG. 11, or gradually over some part or even over all of the working region of angular measurement.

Although, for purposes of explanation, reference has been made to a displacement to be measured, it is to be understood that this expression also includes the notion of a displacement to be recorded, the concept of a displacement to be represented by real time by an electrical signal for any type of processing or utilization circuit, to be sampled, and the like.

Although the invention has been described with respect to particular illustrative embodiments, it is to be understood that variations are possible within the inventive concept.

I claim:

1. An inductive angular displacement sensor for converting mechanical movement in angular displacement into an electrical signal in accordance with a desired relation between angular displacement of a body, the angular displacement of which is to be measured, and the magnitude of said electrical signal, comprising:
   a ferromagnetic core having at least two circularly elongated legs (7,8) connected by a yoke portion (2) of said core at one end of said legs, said legs having an elongated gap between them of a width that varies along the circularly bent length of said legs,
   a magnet winding (1) in the neighborhood of the yoke portion (2) of said core (3) wound so as to produce magnetic flux in said elongated gap(s) between the legs (7,8) of said core (3),
   a short-circuiting ring member (4) pivoted on an axis perpendicular to the plane of curvature of said legs and passing through their centers of curvature, said short-circuiting ring member providing a short-circuiting path around and substantially adjacent to each leg of the core at substantially the same angular position with respect to said axis and being angularly displaceable about said axis and along the bent length of said core legs in response to angular displacement of the body the displacement of which is to be measured, and
   an oscillator circuit (30, 32, 34) in which said magnet winding is connected for varying the frequency of oscillation in accordance with the angular displacement of said short-circuiting ring member, said oscillator comprising the series combination of a comparator (30) having a hysteresis characteristic, an inductance circuit which includes said magnet winding (1) and an integrator (34), and in which the output of said integrator (34) is connected with the variable voltage input of said comparator (30).

2. An inductive angular displacement sensor for converting mechanical movement in angular displacement into an electrical signal in accordance with a desired relation between angular displacement of a body, the angular displacement of which is to be measured, and the magnitude of said electrical signal, comprising:
   a ferromagnetic core having at least two circularly elongated legs (7,8) connected by a yoke portion (2) of said core at one end of said legs, said legs having an elongated gap between them of a width that varies along the circularly bent length of said legs,
   a magnet winding (1) in the neighborhood of the yoke portion (2) of said core (3) wound so as to produce magnetic flux in said elongated gap(s) between the legs (7,8) of said core (3),
   a short-circuiting ring member (4) pivoted on an axis perpendicular to the plane of curvature of said legs and passing through their centers of curvature, said short-circuiting ring member providing a short-circuiting path around and substantially adjacent to each leg of the core at substantially the same angular position with respect to said axis and along the bent length of said core legs in response to angular displacement of the body the displacement of which is to be measured, and
   an oscillator circuit (30, 32, 34) in which said magnet winding is connected for varying the frequency of oscillation in accordance with the angular displacement of said short-circuiting ring member, said oscillator being composed of an LR integrator (60–62 or 62, 90) including said magnet coil (1) in order to have a variable inductance, and a comparator (30) having hysteresis, the output of said LR integrator being connected to the variable voltage input of said comparator (30) and the output of said comparator being connected to the input of said LR integrator (60-62 or 62, 90).

3. An inductive angular displacement sensor as defined in claim 2, in which said LR integrator is composed of a variable inductance circuit including said magnet winding and a resistance path (90) connected between ground and said magnet winding, and in which said comparator (30) consists principally of an operational amplifier.

4. An inductive angular displacement sensor as defined in claim 1, in which said inductance circuit includes a second integrator (50) the output of which is connected to a variable inductance provided by said magnet winding (1) and in which a transformer is formed by the provision of a secondary winding adjacent to and coupled with said magnet winding (1), so that said magnet winding acts as the primary of said transformer, and in which the output of said inductance circuit is an ungrounded terminal of said additional secondary winding.

5. An inductive angular displacement sensor as defined in claim 4, in which said inductance circuit includes a resistance (52) of a magnitude suitable for feeding back a weak direct current from the output of said inductance circuit to the input of said second integrator (50) and thereby stabilizing the oscillator of which said inductance circuit is a portion.

6. An inductive angular displacement sensor as defined in claim 1, in which the sensing sensitivity characteristic is modified at high frequency by the provision of a delay circuit (73–76) effective above a predetermined frequency in said comparator (30), which delay circuit is arranged to cause the switching thresholds of the comparator (30) to be symmetrically shifted in accordance with frequency at frequencies in the range in which the delay circuit is effective.

7. An inductive angular displacement sensor as defined in claim 1, in which the displacement sensing characteristic is non-linearly modified by the provision of a function generator (84) connected so as to change the input voltage of the integrator (34) of said oscillator circuit as a function of the output voltage of said inductance circuit (32).

8. An inductive angular displacement sensor as defined in claim 1, in which a rectifier stage (33) is connected to the output of said inductance circuit (32) to provide at the output of said rectifier stage a signal output (35) for furnishing an analog-type signal corresponding to the angular displacement measured by said sensor.

9. An inductive angular displacement sensor as defined in claim 2, in which the output of said LR integrator (60–62 or 62, 90) is connected to a differentiator, followed by a rectifier stage (33) at the output of which (35) an analog signal corresponding to displacement measured by the angular displacement sensor is available.

* * * * *